United States Patent

Tulet et al.

[11] Patent Number: 6,084,659
[45] Date of Patent: Jul. 4, 2000

[54] PHOTOSENSITIVE CHARGE COUPLED ACCUMULATION DEVICE AND LIDAR INCORPORATING SUCH A DEVICE

[75] Inventors: Michel Tulet, Balma; Frédéric Fabre, Toulouse; Didier Morancais, Beaupuy, all of France

[73] Assignee: Matra Marconi Space France, Paris, France

[21] Appl. No.: 09/164,360

[22] Filed: Oct. 1, 1998

[30] Foreign Application Priority Data

Oct. 3, 1997 [FR] France .................................. 97 12340

[51] Int. Cl.$^7$ ........................................ H04N 3/15
[52] U.S. Cl. ........................ 356/5.01; 356/5.04; 348/311; 348/317
[58] Field of Search ................ 356/4.01, 5.01–5.08; 348/311, 317

[56] References Cited

U.S. PATENT DOCUMENTS

| | | | |
|---|---|---|---|
| 4,727,259 | 2/1988 | Halvis | 250/561 |
| 4,881,809 | 11/1989 | Thierry . | |
| 5,056,914 | 10/1991 | Kollodge . | |
| 5,166,800 | 11/1992 | Mori et al. | 358/213.27 |
| 5,220,164 | 6/1993 | Lieber et al. . | |

FOREIGN PATENT DOCUMENTS

| | | |
|---|---|---|
| 0438335 | 1/1991 | European Pat. Off. . |
| 0516543 | 5/1992 | European Pat. Off. . |
| 2735935 | 6/1995 | France . |

*Primary Examiner*—Stephen C. Buczinski
*Attorney, Agent, or Firm*—Nath & Associates; Gary M. Nath; Harold L. Novick

[57] ABSTRACT

The CCD device is suitable for use in a lidar. It has an image zone constituted by a matrix of M lines and N columns of photosensitive sites for receiving a light signal and generating charges, a first memory zone constituted by a matrix of P lines and N columns of non-photosensitive sites, a read-out register having a single line of N sites, and a second memory zone having P lines of N sites, apt to receive in parallel charges contained in the N sites of the read-out register. The first memory zone has a first line of sites apt to receive and to sum charges generated in a respective column of the image zone at the end of each of successive acquisition periods. The second memory zone stores and transfers charges to N sites of a same line of the image zone or the first memory zone whereby accumulating, in each line of the first memory zone, charges accumulated during an observation period and resulting from a plurality of successive summations. At the end of each acquisition period, a timer transfers at high speed the charges present in all sites of all columns of the image zone along the columns to respective sites of the line which achieves summation.

10 Claims, 2 Drawing Sheets

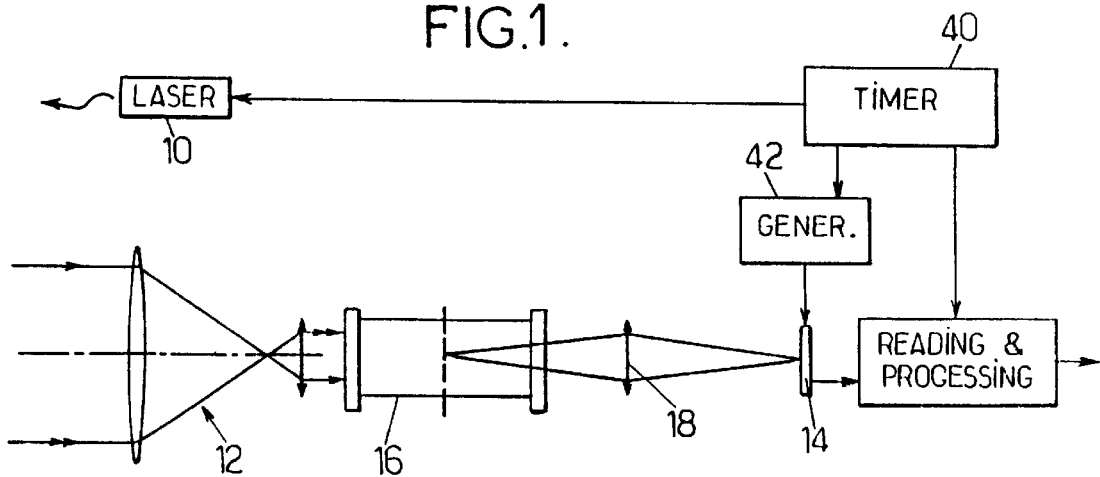
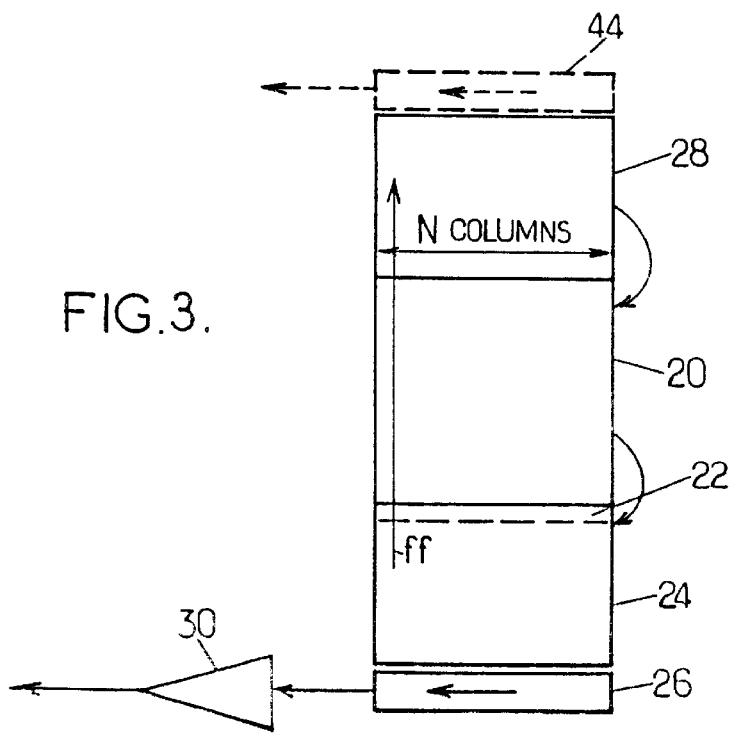

PHOTOSENSITIVE CHARGE COUPLED ACCUMULATION DEVICE AND LIDAR INCORPORATING SUCH A DEVICE

BACKGROUND TO THE INVENTION

The present invention relates to a photosensitive CCD device, enabling the analysis of a light signal. It finds a particularly significant application, although not exclusive, in equipment called "lidars" enabling the measurement of the distance from obstacles or from environments which cause back scattering or reflection of short light impulses. Such lidars are particularly used for determining the altitude and the position of clouds from time of flight measurements of back scattered laser impulses by the surface of clouds. A particular type of lidar, called "wind lidar", enables the measurement of the mean speed of the wind in altitude sections, by using the shift of the wave length caused by the Doppler effect.

A photosensitive charge coupled and storage device has already been proposed (FR-A 2735 935) enabling the analysis of a light signal, incorporating a matrix of photodetectors. This detector, called CCD, shows numerous advantages, above all when a high sensitivity is required. The CCD detectors can be made in a way to have a high quantum efficacy from ultraviolet up to near infrared; they enable bringing together, on a same microchip, charge integration and analogical storage functions. They enable the transfer of charges at a high frequency. Their read-out noise level is low.

The charge coupled device in accordance with patent FR 2735 935 already mentioned includes an image zone constituted by a matrix with N columns of photosensitive sites receiving the light signal, a memory zone constituted by a matrix of N columns of non-photosensitive site columns each line of which receives the charges which appeared in the image zone during an acquisition period (which in the case of the use in a lidar will correspond to a time of the back scattered signal from an impulse laser) and a read-out register of N sites which receives the charges stored in the lines of the memory zone, each in turn. At the border between the image zone and the memory zone the system has an integration zone constituted by a line of N sites in which are accumulated, column by column, the charges collected in the image zone during the acquisition period. The number of lines of the memory zone corresponds to the number of sampling time windows in the case of a lidar. The read-out register is read at the frequency of the laser shots in the case of a lidar, i.e. in intervals corresponding at least to one observation period of the back scattering.

In the case of a wind lidar, the device is connected to a spectrometer enabling the linking of each image zone column with a spectral shift, and therefore to a different speed.

Such a device enables lowering the read-out frequency to a read-out per shot in the case of a lidar. But it requires, for many applications where the intensity of the back scattered light is very weak, a CCD detector having an intensifier element, such as a micro-channel wafer, enabling it to work by counting photons. Indeed, a plain charge coupling device would present a high read-out noise, liable to degrade the measurements in the case of a reader at the close of each observation period, particularly a lidar where the read-out is then at each shot.

SUMMARY OF THE INVENTION

The present invention aims to enable accumulation of the charges in an analogical manner, in charge coupled means, enabling read-out the device only at intervals corresponding to several observation periods, therefore to several successive shots in the case of a lidar.

For that purpose there is provided a photosensitive CCD device, enabling the analysis of a light signal, including:

an image zone constituted by a matrix of M lines and N columns of photosensitive sites, intended to receive the light signal, a first memory zone constituted by a matrix of P lines and N columns of non-photosensitive sites, intended to receive in a first integration line the sum of the charges acquired in an integration zone, at the close of each of successive acquisition periods, a read-out register having a single line of N sites, for receiving in parallel the charges stored in the last line of the memory zone line, a second memory zone, or auxiliary memory, with P lines of N sites, intended to receive the contents of the first memory zone before each of the acquisition periods.

In this way can be obtained in particular a feed-back on the image zone or the first memory zone, enabling the accumulation in each line of the first memory zone the charges coming from several successive summations.

The device may further include timing means for:

at the end of each acquisition period, transferring at high speed the charges present in all the sites of the columns of the image zone along the columns to respective sites of the integration line, and during each observation period, transferring the charges accumulated in each site of the integration zone step by step, at the frequency of the acquisitions, along the columns of the memory zone, to the read-out register.

The second memory zone is in general identical to the first memory zone.

Numerous embodiments of the invention are possible.

In a first case, the read-out register comprises at least N additional sites to which are transferred the charges coming from the last line of the first memory zone for transfer into the second memory zone and the second memory zone is arranged to enable the series transfer of the accumulated charges which it contains to an integration zone. In this zone will be accumulated, at the end of each acquisition period, the contents of the corresponding lines of the second memory zone and of the image zone. The integration zone can be constituted by a shift register with at least 2N sites, having N sites receiving in parallel the contents of the last line of the second memory zone and N sites capable of summing the charges which they contain and the charges transferred from the image zone.

In a second case, the second memory zone is so arranged that the charges contained in each line of the second memory zone and which come from the corresponding lines of the first memory zone, can be transferred into the corresponding lines of the image zone before each observation period.

The timing means can be similar to that described in patent FR 2 735935 to which reference may be made. It is only necessary to provide a timer having additional outputs for control of the transfers to the second auxiliary memory and from it.

Each of the architectures above enable to use, in the image zone, a plain charge coupling device, simpler than a light intensifier device, as well as to detect at wave lengths where light intensifiers are less effective, particularly in the near infrared.

The above features as well as others will appear better by the read-out of the description which follows of particular embodiments, given as non limited examples. The description refers to the accompanying drawings;

BRIEF DESCRIPTION OF THE DRAWINGS

FIG. 1 is a diagram of the principle of a wind lidar in accordance with one embodiment of the invention;

FIG. 3, similar to FIG. 2, shows a modified embodiment.

DETAILED DESCRIPTION

Figure 2:
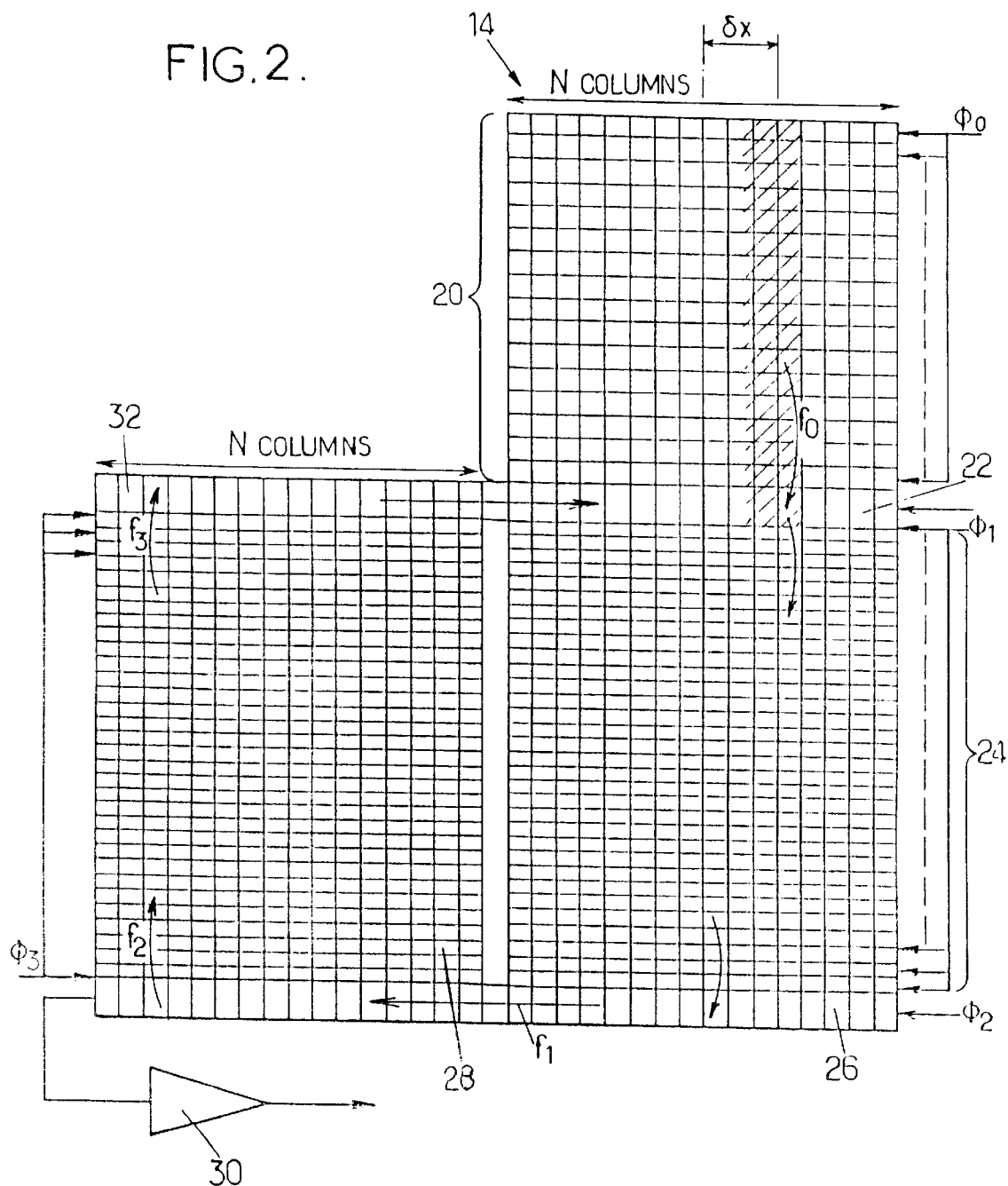
FIG. 2 is a diagrammatic plan view of a photosensitive device in accordance with a first embodiment of the invention.

Referring to FIG. 1, a lidar includes a source 10 of short light impulses (typically 20 to 30 ns), generally constituted by a garnet laser. The back scattered light flux, which presents a wavelength shift $\delta\lambda$ proportional to the speed of the obstacle or of the environment giving rise to back scattering, is collected by an optical telescope 12 which supplies a parallel beam to an interference filter 16, which can particularly be a Fizeau interferometer. This interferometer has the function of generating a linear fringe the position of which is shifted, relative to a median plane, responsive to the spectral shift $\delta\lambda$. Output optics 18 form the image of the output fringe(s) of the interferometer on the image zone of a CCD detector 14.

A timer 40 controls the laser 10 and a generator 42 which delivers the signals necessary for the transfer of charges in the CCD detector.

The photosensitive device 14 the composition of which is shown in FIG. 2 comprises an image zone 20 having a matrix of M lines and N columns of photosensitive sites. The image zone is followed, in the direction $f_0$ transfer of the parallel charges, by an integration zone 22 constituted by a single line of sites, not photosensitive (for example masked). Further in the transfer direction of the parallel charges, the integration zone 22 is followed by a first memory zone 24, constituted by a matrix of P lines and N columns of non-photosensitive sites and by a read-out register 26 with parallel inputs and series output in the direction indicated by the arrow $f_1$.

The device of FIG. 2 includes a second memory zone 28 having also a matrix of P lines and N columns of non-photosensitive sites. The read-out register 26 comprises at least 2N sites. The first N sites are located to receive in parallel the charges transferred from the first memory zone, line by line. The last N sites are arranged to transfer in parallel the charges which they contain into the first line (lower line in FIG. 2) of the second memory 28, as indicated by the arrow $f_2$. The register 26 can also be emptied in series onto an output stage 20.

The integration zone 22 is planned to receive, line by line, the contents of the second memory zone 28 and to accumulate, in the site belonging to a given column, the charges coming from the corresponding site of the corresponding column of the second memory 28 and all charges trapped in a column of the image zone 20 during an acquisition period.

For that purpose, the integration zone 22 consists of the last N sites of a shift register with at least 2N sites. The first N sites constitute a buffer 32 in which the contents of the second memory 28 are transferred in parallel, line by line, as indicated by the arrow $f_3$.

The following characteristics can be considered as typical, in the case of a wind lidar having a laser supplying 20 ns impulses and having an acquisition period of 8 $\mu$s:

Monolithic detector on silicon, with masking by an aluminium deposit or by separate mask, and square sites of 20 $\mu$m side M=N=16 pixels P=10 pixels Register of 2N+1=33 sites Output stage 30 with gain of 10 $\mu$V/e$^-$ The interference fringe has a position shifted from the axis by a distance $\delta x$ proportional to $\delta\lambda$, with an energy distribution which can lead it to cover several columns. A localisation with a better precision than a pixel (width of a site) can be obtained by calculation of the barycenter.

The operation during the first observation period is the same as that described in patent FR 2 735 935 but read-out is only carried out at the end of a high number of observation periods, typically from 100 to 2000.

The sequence is as follows:

(1) The lines of the image zone 20 are accumulated at a high frequency in the register 22 at the end of each acquisition period, under the action of shift signals $\phi_0$.

(2) During the following acquisition period, the charges are transferred from the register 22 into the first line of the first memory zone 24, in which the lines are moved as a whole. The operations are repeated until the P lines of the first memory contain the results corresponding to P successive time separated acquisitions, i.e. to P time distributed samplings (signals $\phi_1$).

(3) At the end of this first observation, the complete contents of the first memory zone 24 are transferred into the second memory zone 28 via register 26 (signals $\phi_1$, $\phi_2$ and $\phi_3$).

(4) Before commencing a second observation period, the charges contained in the last line of the memory zone 28 are loaded into the sites 32 of the second register, then moved under the image zone 20.

At the outcome of the first acquisition period of a same observation period, the collected charges are added to those of the previous acquisitions during the transfer of the image into the sites 22 of the shift register. This operation is carried out for the P time spaced sets of samples, each time by transferring the contents of a line of the second memory zone 28 into the sites 22.

(5) The phases (3), (4) and (5) are repeated.

(6) After accumulation of the desired number of observations, the charges are read-out by means of the output stage of the register 26.

FIG. 3, where the parts corresponding to those of FIG. 2 are designated by the same reference number, describes a second embodiment. The detector is constituted by an image zone 20 surrounded by the first memory zone 24 and 24. It can belong to this memory or be constituted by an additional element. Downstream of the first memory zone 24; in the direction of movement of the charges during the observation, a read-out register 26 connected to the output stage 30 is provided. The read-out register can also be placed in 44 so as to receive the contents of the second memory zone 28. Two registers can be provided, one for read-out, the other for the evacuating stray charges. The latter register can be replaced by a purge drain.

The embodiment of FIG. 3 is simpler than that of FIG. 2 concerning the structure of the detector. But in compensation, it requires that the image zone and the memory zones can be controlled independently and in a bidirectional manner, in order to enable the read-out.

In the embodiment of FIG. 3, the sequence of operation can be as follows:

(1) All the lines of the image zone 20 are accumulated in the first line of the memory zone 24 at the end of the first acquisition period.

(2) During the following acquisition, the charges are transferred from the first to the second line of the memory zone by shifting them all together.

(3) The steps are repeated until all P lines of the first memory 24, corresponding to P time samples, have received charges.

(4) At the end of this first observation sequence, the whole of the contents of the first memory zone 24 are transferred into the second memory zone 28. This is carried out by transferring the image zone 20 (arrow ff in FIG. 3).

(5) Finally, the above sequence is repeated during a predetermined number of observations.

When the invention is used in a lidar in the setting up of a lidar, the timing means are arranged to cause the accumulation of charges during successive acquisition periods corresponding to different times of flight and to cause the successive observations at the rate of the impulses sent by the source.

The device can comprise a source of short light impulses, substantially monochromatic, enabling the accumulation of several successive images by line by line transfer from the image zone 20 to the memory zone 24; this source can in particular be of the type described in French patent 2 602 057, to which reference may be made.

We claim:

1. A photosensitive CCD device for global analysis of a light signal during a plurality of observation periods each comprising a plurality of successive acquisition periods, including:

an image zone constituted by a matrix of M lines and N columns of photosensitive sites for receiving the light signal and generating charges, M and N being integers greater than 1;

a first memory zone constituted by a matrix of P lines and N columns of non-photosensitive sites having a first line of sites each of which is adapted to receive and to sum charges generated in a respective column of the image zone at the end of each of successive acquisition periods, P being an integer greater than 1;

a read-out register having a single line of N sites, each adapted to receive charges stored in a respective site of a last line of the first memory zone;

a second memory zone having P lines of N sites, adapted to receive in parallel, charges contained in the N sites of the read-out register and adapted to store said charges and to transfer said charges to N sites of a same line of the image zone or the first memory zone thereby accumulating, in each line of the first memory zone, charges accumulated during said observation period and resulting from a plurality of successive summations; and timing means for:
at the end of each said acquisition period, transferring, at a high speed as compared to acquisition, the charges present in all sites of all columns of the image zone along the columns to respective sites of the integration line, and during each observation period, transferring the charges accumulated in each site of the integration zone step by step, at a frequency of the successive acquisition periods, along the columns of the memory zone, to the read-out register.

2. Device according to claim 1, wherein M and P are equal.

3. Device according to claim 1, wherein the read-out register further comprises at least N additional sites, located in series relation with the first named N sites, and said timing means are arranged to cause transfer of the charges from the last line of the first memory zone into the second memory zone and to cause series transfer of the accumulated charges from the second memory zone to an integration zone for return to the image zone.

4. Device according to claim 3, wherein the integration zone is arranged for the sites thereof to store the charges contained in the sites of a line of the second memory zone.

5. Device according to claim 3, wherein the integration zone is a shift register with at least 2N sites, having N sites receiving in parallel the contents of the last line of the second memory zone and N sites for summing charges which they contain and charges transferred from the image zone.

6. Device according to claim 1, wherein the second memory zone is so arranged that the charges contained in each line of the second memory zone and which come from respective lines of the first memory zone are transferred to the lines of the image zone before each acquisition period.

7. A photosensitive CCD device for global analysis of a light signal during a plurality of observation periods each comprising a plurality of successive acquisition periods, including:

an image zone constituted by a matrix of M lines and N columns of photosensitive sites for receiving the light signal and generating charges, M and N being integers greater than 1;

a first shift register having a single line of 2N sites each of N last sites thereof being adapted to receive and to sum all charges generated in a respective column of the image zone at the end of each of successive acquisition periods, a first memory zone constituted by a matrix of P lines and N columns of non-photosensitive sites having a first line of sites, P being an integer greater than 1;

a second shift register having a single line of 2 N sites, each of N first sites thereof being adapted to receive charges stored in a respective site of a last line of the first memory zone by transfer through the image zone in a second direction opposite to said first direction;

a second memory zone having P lines of N sites, adapted to receive in parallel charges contained in the last N sites of the second shift register and adapted to store said charges and to transfer them from line to line and then to N first sites of the second shift register for transfer into last N sites of said first shift register; and timing means for:
(a) at the end of each said acquisition period of a same observation period, transferring, in a time short as compared to the duration of each acquisition period, the charges present in all sites of all columns of the image zone along the columns to respective sites of the N last sites of the first shift register, (b) repeatedly, during a same one of said observation periods, transferring the charges accumulated in all sites of the N last sites of the first shift register, one line at a time, at the frequency of the acquisitions, along the first N sites of the second shift register, into the columns of the first memory zone, (c) at the end of each said observation period, transferring the charges contained in the first memory zone into the second memory zone via the second shift register, and (d) repeating steps (a), (b) and (c), each time after the charges contained in the sites of a last line of the second memory zone have been transferred to the N first sites of the first shift register and therefrom to the N last sites thereof.

8. A lidar having:

a source of pulse light;

a photosensitive CCD device for analysis of a light signal during a plurality of observation periods each comprising a plurality of successive acquisition periods, including:

an image zone constituted by a matrix of M lines and N columns of photosensitive sites for receiving the light signal and generating charges, M and N being integers greater than 1;

a first memory zone constituted by a matrix of P lines and N columns of non-photosensitive sites having a first line of sites, each of which is adapted to receive and to sum charges generated in a respective column of the image zone at the end of each of successive acquisition periods, P being an integer greater than 1;

a read-out register having a single line of N sites, each adapted to receive charges stored in a respective site of a last line of the first memory zone;

a second memory zone having P lines of N sites, adapted to receive in parallel, charges contained in the N sites of the read-out register and adapted to store said charges and to transfer said charges to N sites of a same line of the image zone or the first memory zone thereby accumulating, in each line of the first memory zone, charges accumulated during said observation period and resulting from a plurality of successive summations; and timing means for:

at the end of each said acquisition period, transferring, at a high speed as compared to acquisition, the charges present in all sites of all columns of the image zone along the columns to respective sites of the integration line, and during each observation period, transferring the charges accumulated in each site of the integration zone step by step, at the a frequency of the successive acquisition periods, along the columns of the memory zone, to the read-out register.

9. Lidar according to claim 8, having an interferometer located on a path of the reflected light for directing spectral components at different wave lengths to different columns of the image zone.

10. A photosensitive CCD device for global analysis of a light signal during a plurality of observation periods each comprising a plurality of successive acquisition periods, including:

an image zone constituted by a matrix of M lines and N columns of photosensitive sites for receiving the light signal and generating charges, M and N being integers greater than 1;

a first memory zone constituted by a matrix of P lines and N columns of non-photosensitive sites having an integrating first line of sites each of which is adapted to receive and to sum charges generated in a respective column of the image zone at the end of each of successive acquisition periods, and transferred along the column in a first direction, P being an integer greater than 1;

a read-out register having a single line of N sites, each adapted to receive charges stored in a respective site of a last line of the first memory zone; by a second memory zone having P lines of N non-photosensitive sites, adapted to receive, in parallel, charges contained in the the first memory zone by transfer through the image zone in a second direction opposite to said first direction and adapted to store said charges and later to transfer said charges to N sites of a same line of the image zone or the first memory zone thereby accumulating, in each line of the first memory zone, charges accumulated during said observation period and resulting from a plurality of successive summations; and timing means for:

(a) at the end of each said acquisition period of a first observation period, transferring in said first direction, at a high speed as compared to acquisition, the charges present in all sites of all columns of the image zone along the columns to respective sites of the integrating first line, and (b) transferring the charges accumulated in each site of the integrating first line step by step, at the frequency of the acquisitions of the same observation period, along the columns of the first memory zone, until all P lines of the first memory zone have received charges, (c) at the end of each said observation period, transferring the charges contained in the first memory zone into the second memory zone in said opposite direction through said image zone for summation of the transferred charges with the charges already stored in the second memory zone and then transferring the charges contained in each line of the second memory into sites in respective lines of the image zone; and (d) repeating steps (a), (b) and (c), a plurality of times and prior to read out of the contents of one of the memory zones.

* * * * *